US 12,490,828 B2

United States Patent
Weber et al.

(10) Patent No.: US 12,490,828 B2
(45) Date of Patent: Dec. 9, 2025

(54) SUSPENSION ARRANGEMENT, SYSTEM AND METHODS

(71) Applicants: Lana Weber, Veysonnaz (CH); Kosei Weber, Veysonaz (CH)

(72) Inventors: Lana Weber, Veysonnaz (CH); Kosei Weber, Veysonaz (CH)

( * ) Notice: Subject to any disclaimer, the term of this patent is extended or adjusted under 35 U.S.C. 154(b) by 0 days.

(21) Appl. No.: 18/408,619

(22) Filed: Jan. 10, 2024

(65) Prior Publication Data
US 2025/0221522 A1    Jul. 10, 2025

(51) Int. Cl.
*A47B 23/00*    (2006.01)
*F16M 13/02*    (2006.01)

(52) U.S. Cl.
CPC ......... *A47B 23/007* (2013.01); *F16M 13/027* (2013.01)

(58) Field of Classification Search
CPC .............................. A47B 23/007; F16M 13/027
USPC .......................... 248/317, 320, 322, 327, 339
See application file for complete search history.

(56) References Cited

U.S. PATENT DOCUMENTS

| | | | | |
|---|---|---|---|---|
| 3,807,609 A | * | 4/1974 | Tymoszek | A47G 25/36 |
| | | | | 223/98 |
| 5,350,071 A | * | 9/1994 | Pond | B25H 3/06 |
| | | | | 248/318 |
| 6,021,535 A | * | 2/2000 | Baus | A47C 16/025 |
| | | | | 297/217.3 |
| 7,780,049 B1 | * | 8/2010 | Baranoski | A45F 3/14 |
| | | | | 248/323 |
| 7,922,249 B2 | | 4/2011 | Marchand | |
| 8,020,827 B2 | * | 9/2011 | Schieren | A45D 20/16 |
| | | | | 248/317 |
| 8,104,655 B2 | * | 1/2012 | Zhang | A45F 5/00 |
| | | | | 224/614 |
| 9,944,217 B2 | | 4/2018 | Schroeder | |
| 10,066,784 B2 | | 9/2018 | Wessels | |

(Continued)

FOREIGN PATENT DOCUMENTS

| | | | | | |
|---|---|---|---|---|---|
| CA | | 2600917 A1 | * | 3/2009 | A45F 3/14 |
| JP | | 2004326267 A | * | 11/2004 | |

(Continued)

OTHER PUBLICATIONS

Amiline in Workshop, Laptop Mounted on Wall Above Bed, 2013, Autodesk instructables, https://www.instructables.com/Laptop-mounted-on-wall-above-bed/#ible-footer-portal, (Year: 2013).*

(Continued)

*Primary Examiner* — Kimberly T Wood
(74) *Attorney, Agent, or Firm* — Matthew D. Thayne; Thayne and Davis LLC (57) ABSTRACT

A suspension device for a laptop or hinged electronic article is disclosed. The suspension device comprises a first elongate suspension member, a second elongate suspension member extending from the first elongate suspension member and a carrier between the first and second members. A sheath may be provided through which the connecting member extends. The device may also comprise an elongate stabilizer which may serve multiple functions including but not limited to: prevention of spinning, elevation of the screen to a suitable viewing angle, and dampening of movement if the electronic article if inadvertently moved.

8 Claims, 5 Drawing Sheets

(56) References Cited

U.S. PATENT DOCUMENTS

| | | | |
|---|---|---|---|
| 10,503,207 B1 | 12/2019 | Knoppert | |
| 10,514,126 B2 | 12/2019 | Asante | |
| 10,761,568 B2 * | 9/2020 | Daley, III | H04N 5/64 |
| 10,932,563 B2 | 3/2021 | Taylor | |
| 11,573,611 B2 | 2/2023 | Chan | |
| 11,751,685 B2 * | 9/2023 | Hall | A47B 51/00 |
| | | | 211/113 |
| 11,877,635 B2 * | 1/2024 | Boss | A45C 11/00 |
| 2007/0012827 A1 * | 1/2007 | Fu | A47B 23/007 |
| | | | 248/163.1 |
| 2009/0220704 A1 * | 9/2009 | Eustace | B05D 1/045 |
| | | | 248/339 |
| 2009/0321490 A1 * | 12/2009 | Groene | A45C 11/00 |
| | | | 224/257 |
| 2013/0094230 A1 * | 4/2013 | Verfuerth | F21V 21/112 |
| | | | 362/396 |
| 2016/0209869 A1 * | 7/2016 | Daley, III | G06F 1/1698 |
| 2021/0102410 A1 * | 4/2021 | Smiley, III | E05B 73/0005 |

FOREIGN PATENT DOCUMENTS

| | | | |
|---|---|---|---|
| JP | 6918901 B2 | 8/2021 | |
| KR | 102074867 B1 | 3/2020 | |
| WO | WO-2015164945 A1 * | 11/2015 | A45F 5/1525 |

OTHER PUBLICATIONS

Mgsloan, Supine Computing, Dec. 18, 2019, https://mgsloan.com/posts/supine-computing/ (Year: 2019).*

Mgsloan, Laptop Ceiling Suspension, May 2, 2020, https://mgsloan.com/posts/suspending-laptops/ (Year: 2020).*

Ergoquest, "Ergoquest Zero Gravity Chairs and Workstations", <http://www.ergoquest.com/zero-gravity-workstations.html>, retrieved Jan. 21, 2024.

Shenzhen Omax Technology Co., Ltd., "Ergonomic Lapdesk Adustable Laptop Desk Bed Tray", <https://www.alibaba.com/product-detail/Ergonomic-Lapdesk-adjustable-Laptop-desk-bed_1759985703.html?spm=a2700.details.0.0.21d57264OEjUNJ>, retrieved Jan. 21, 2024.

Shenzhen Omax Technology Co., Ltd., "Universal Lying Down Laptop Support Tray Laptop Bed Stand Holder", <https://www.alibaba.com/product-detail/Universal-Lying-Down-Laptop-Support-Tray_1886015805.html>, retrieved Jan. 22, 2024.

Paul Strauss, "Lie-Down Laptop Stand Lets You Work Like an Astronaut in Bed", Technabob, Jul. 28, 2013, <https://technabob.com/workez-adjustable-laptop-stand/>, retrieved Jan. 22, 2024.

Hyvarwey, "Ultra Long Arm Aluminum Alloy Full Motion Wall Mount Laptop Holder Bed Pole Mount Laptop Stand Arm Monitor Holder", <https://de.aliexpress.com/item/32814271738.html?gatewayAdapt=glo2deu>, retrieved Jan. 22, 2024.

"Tablet Holder for Bed", Nov. 26, 2019, <https://cordellhaney.blogspot.com/2019/11/tablet-holder-for-bed.html>, retrieved Jan. 22, 2024.

"Laptop Stand for your Bed", <https://laptopdes.com/what-is-a-laptop-holder-for-bed-and-what-is-the-point-of-it/laptop-stand-for-your-bed/>, retrieved Jan. 22, 2024.

Ergoquest Inc, "Over Bed Computer Desk by ErgoQuest", 2018, <https://www.youtube.com/watch?v=hGfgFWc1U0I>, retrieved Jan. 22, 2024.

Improvised Life, "Bed Desk Solutions for Working in Bed (and What to Avoid)", <https://www.pinterest.ph/pin/650910952405327484/>, retrieved Jan. 22, 2024.

* cited by examiner

SUSPENSION ARRANGEMENT, SYSTEM AND METHODS

This invention relates to methods and assemblies for suspending laptops, along with related methods and systems.

Electronic articles, especially laptops and electronic notepads, may be oriented in a variety of angles, orientations and locations. There are various ways to store or secure electronic articles including hanging, standing or directly resting on a support such as a table. For example, electronic articles may be releasably affixed to booms or frames. Disadvantages of such systems may include significant expense, consumption of limited spaces and aesthetic drawbacks. Some prior art may be seen as: U.S. Pat. No. 7,922,249, titled "Adjustable Workstation", U.S. Pat. No. 9,944,217, titled "Equipment Mounting System", U.S. Pat. No. 10,066,784_titled "Folding Handheld Device Holding System", U.S. Pat. No. 10,503,207, titled "Dock For A Multi-Form Factor Information Handling System", U.S. Pat. No. 10,514,126, titled "Multi-Function Travel-Friendly Workstation With Cooling And Ventilation", U.S. Pat. No. 10,932,563 titled "Portable Stand For Portable Electronic Devices", U.S. Pat. No. 11,573,611 titled "Infinite Holding Pivot Mechanisms For Dual Screen Systems", Japan Patent No. 6918901B2 titled "Mechanical Installation System", Korean Patent No. 102074867B1 which are hereby incorporated in their entirety by reference.

According to one aspect of this invention, there is provided a suspension arrangement for an article comprising an elongate first suspension member, an elongate second suspension member extending from the first suspension member, and a bearing member between the first and second suspension members.

According to another aspect of this invention, there is provided a method of using a suspension arrangement as described above, comprising mounting the suspension arrangement on a main support so that the first and second suspension members extend downwardly, and arranging the article on the bearing member so that the article is carried by the bearing member, thereby suspending the article from the main support.

According to another aspect of this invention, there is provided a suspension system comprising an article and a suspension arrangement described above, wherein the article is suspended from the suspension arrangement.

The article may be carried by the bearing member. The article may be suspended from the first and second suspension members.

The suspension arrangement may include an elongate third suspension member from which the first and second suspension members extend. The article may be suspended from the first, second and third suspension members. The first and second suspension members may be suspended from the third suspension member. The method may comprise attaching the third suspension member to the main support.

If the article comprises crevice defining features such as hinges or notches that are substantially centrally placed, the first and second suspension members and/or the bearing member may be releasably looped around said features to achieve a degree of support and balance in concert with a main support from above such as a ceiling, roof, rafter, or hospital bed with an overhead frame bar.

The article may be an electronic article. The electronic article may be a hinged electronic article, such as a laptop. The electronic article may further comprise at least one selected from the group of a laptop and an electronic notepad. The article may comprise at least one hinge.

The first and second suspension members may constitute first and second lower suspension members. The third suspension member may constitute an upper suspension member.

The first elongate suspension member, the second elongate suspension member and the bearing member may be integral with each other.

The first suspension member may extend from the second suspension member in a diverging configuration of the first and second suspension members. The first and second suspension members define an inverted V-shape when the article is suspended therefrom. The method may comprise arranging the first and second suspension members to diverge from each other in an inverted V-shape to suspend the article therefrom.

The bearing member may be an elongate bearing member. The bearing member may extend between the first and second suspension members.

Each of the first and second suspension members may have upper and lower opposite ends. The bearing member may be provided at the lower ends of the first and second suspension members. The bearing member may be attached to the first and second suspension members.

The first and second suspension members may extend from the third suspension member.

The third suspension member may be attached to the first suspension member and/or the second suspension member at the upper end of the first and/or second suspension members. The bearing member may extend between the first and second suspension members at the lower ends of the first and second suspension members. The first, second and third suspension members define a Inverted Y-shape when the article is suspended therefrom. The method may comprise arranging the first, second and third suspension members in an inverted Y-shape to suspend the article therefrom.

The bearing member may be elongate. The elongate bearing member may extend from the first suspension member to the second suspension member. The bearing member may constitute a connecting member to connect the first and second suspension members to each other.

The suspension arrangement may comprise a sheath through which the bearing member extends. Where the electronic article comprises a laptop, the sheath may be cut to a size exceeding the distance between the outer edges of the screen-body hinges by 5-10 mm extra. If the suspension members and the bearing member are made of frictionable material they may be less likely to saw through the hinges during prolonged usage or movement.

Alternatively, the suspension arrangement may comprise first and second of the bearing members. Each of the first and second bearing members may be provided on a respective one of the first and second suspension members. Conveniently, the first and second bearing members are provided on the lower ends of the first and second suspension members. The first bearing member may comprise a first hook. The second bearing member may comprise a second hook. The first hook may be provided on the first suspension member. The second hook may be provided on the second suspension member.

The suspension device may comprise a stabilizer. The stabilizer may be a releasable stabilizer. The stabilizer may be elongate. The stabilizer may be a string or ribbon. The suspension arrangement may include a connecting arrangement for connecting the stabilizer to the article. The connecting arrangement may be releasable. The connecting arrangement may comprise a releasable connecter. The releasable connecter may comprise a pad with hook & loop fastener and/or snaps and/or tape and/or clips and/or suction cups and/or magnets.

The stabilizer may be connected to the article. The stabilizer may extend from the article to a support. The method may comprise connecting the stabilizer to the article and to a support, such as a wall.

After being so looped around such features as hinges on a laptop, the method may comprise manipulating the arrangement to engage the suspension arrangement with the electronic article.

The suspension members, the bearing member and the stabilizer may be deformable relative to the electronic article to allow the first and second suspension members and the bearing member to be comfortably slipped over the article. The deformation of the bearing member may be a bending of the bearing member. Bending of the first and second suspension members, the bearing member and the stabilizer may also allow for variations in presentation angles.

The first, second and third suspension members and the bearing member may be formed of a material that is malleable and/or ductile. Each of the first, second and third suspension members and the bearing member may comprise a string, rope, wire, rod, or the like.

Hence it may be desirable to have a system of symmetric and dispersed hanging/support forces on an electronic article applied by arrangements that are: easy to handle, not damaging to the electronic article, low profile, relatively simple, relatively low cost, and aesthetically pleasing.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Further details regarding various embodiments will now be provided with reference to the drawings.

Figure 1:
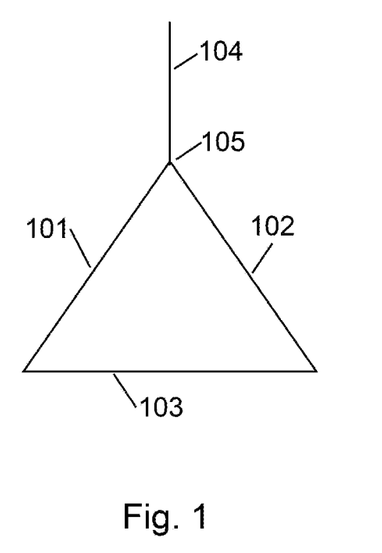
FIG. 1 is a side view of an embodiment of a laptop suspension arrangement comprising suspension and bearing members, without a sheath.

FIG. 1 is a side view of an embodiment of a laptop suspension arrangement comprising elongate first and second suspension members 101 and 102, an elongate third suspension member 104, an elongate bearing member 103 and a junction 105 where the third suspension member 104 meets with the first and second suspension members 101 and 102. The first and second suspension members 101, 102 are arranged in an inverted V-shape. The first, second and third suspension members 101, 102 and 104 are arranged in an Inverted Y-shape. One end of the third suspension member 104 is attached to the main support. The main support may be an upper support, such as a ceiling or an article extending overhead.

This embodiment lacks a sheath. The laptop suspension arrangement may be divided into 2 or more discontinuous parts that may be fixedly or releasably attached by a variety of means including but not limited to screw threads and mates, snaps, hooks, and the like. The first, second and third suspension members 101, 102 and 104 and the bearing member 103 may comprise string, rope or wire and/or extrusion further comprising of metal and/or plastic and/or natural fiber. The laptop or other hinged electronic article is partially inserted into the perimeter bound by the first and second suspension members 101 and 102 and the bearing member 103 until the bearing member 103 is adjacent the outer hinges. The hinged laptop is then dropped over the bearing member 103 so as to engage the bearing member 103 with the outer aspects of the hinges.

Figure 2:
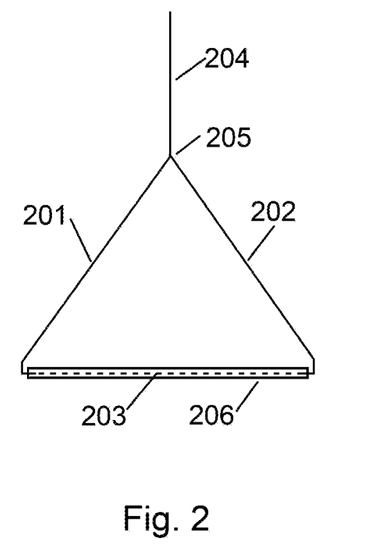
FIG. 2 is a side view of an embodiment of a laptop suspension arrangement comprising suspension and bearing members, and a sheath.

FIG. 2 is a side view of an embodiment of a laptop suspension arrangement comprising elongate first, second and third suspension members 201, 202 and 204, an elongate sheath 206 which contains and through which passes an elongate bearing member 203 and junction 205 where the third suspension member 204 meets with the first and second suspension members 201 and 202. The first and second suspension members 201, 202 are arranged in an inverted V-shape. The first, second and third suspension members 201, 202 and 204 are arranged in a Inverted Y-shape. The sheath 206 in this embodiment comprises a clear vinyl plastic tube of 3 mm internal diameter which is 5 mm longer than the distance from the outer portions of the hinges to spread the bearing member 203 so that it does not frictionably interact with the hinges which carry electronics to the screen. As before, the laptop or other hinged electronic article is partially inserted into the perimeter bound by the first and second suspension members 201 and 202 and the bearing member 203 until the bearing member 203 is adjacent the outer hinges. The hinged laptop is then dropped over bearing member 203 so as to engage the bearing member 203 with the outer aspects of the hinges.

Figure 3:
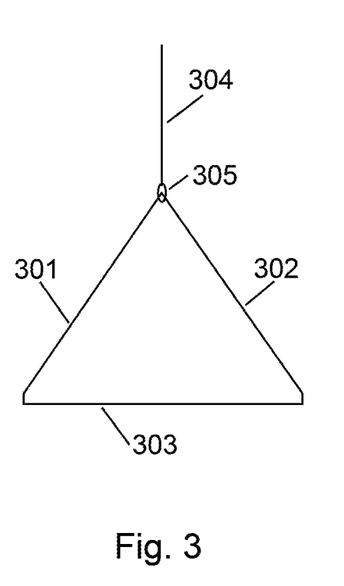
FIG. 3 is a side view of an embodiment of a laptop suspension arrangement comprising a releasable connecter, suspension and bearing members without a sheath.

FIG. 3 is a side view of an embodiment of a laptop suspension arrangement comprising first, second and third suspension members 301, 302 and 304, elongate bearing member 303 and releasable junction 305 where the third suspension member 304 may be releasably attached to the first and second suspension members 301 and 302. The releasable junction 305 may comprise fishing tackle snaps, hooks, rings, and the like. This embodiment lacks a sheath. The first and second suspension members 301, 302 are arranged in an inverted V-shape. The first, second and third suspension members 301, 302 and 304 are arranged in a Inverted Y-shape.

Figure 4:
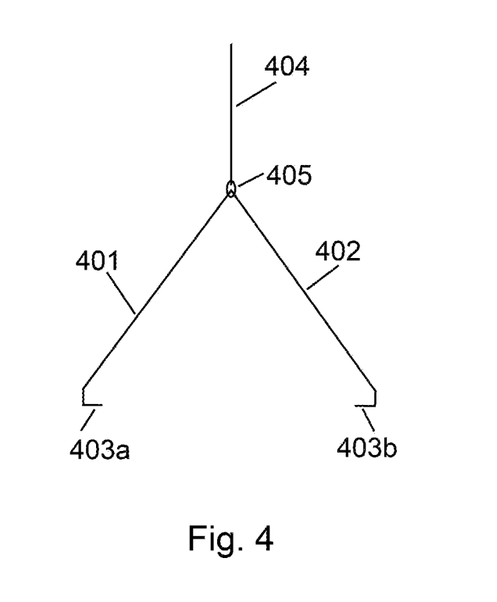
FIG. 4 is a side view of an embodiment of a laptop suspension arrangement comprising a releasable connecter, suspension members and hinge hooks without a sheath.

FIG. 4 is a side view of an embodiment of a laptop suspension arrangement comprising first, second and third suspension members 401, 402 and 404, releasable junction 405, and first and second bearing members in the form of first and second hinge hooks 403a and 403b for supporting the laptop or other hinged article.

The first and second suspension members 401, 402 are arranged in an inverted V-shape. The first, second and third suspension members 401, 402 and 404 are arranged in a Inverted Y-shape. This embodiment lacks a sheath.

Figure 5A:
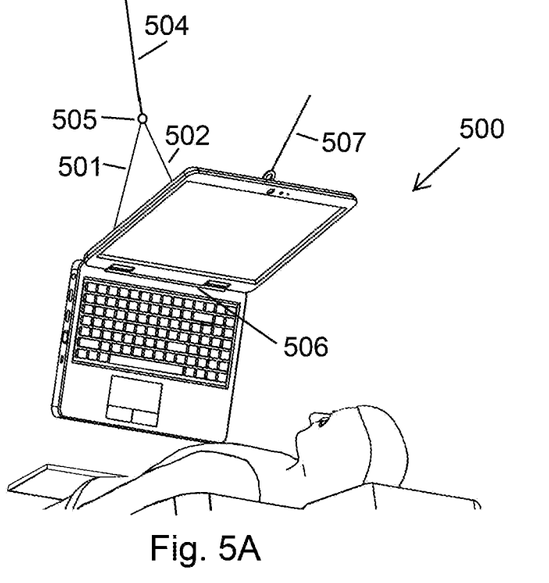
FIG. 5A is a bottom perspective view of an embodiment of a laptop suspension system with a sheath.

FIGS. 5A, 5 B, 5C, and 5D depict an embodiment in different views.

FIG. 5A is a bottom perspective view of an embodiment of a laptop suspension system 500 with a sheath 506. System 500 comprises first, second and third suspension members 501, 502 and 504, an elongate sheath 506 which contains, and through which passes, an elongate bearing member 503 (hidden from view), and junction 505 where the third suspension member 504 (attachment via eye-screw to wood ceiling unseen) meets with the first and second suspension members 501 and 502. The first and second suspension members 501, 502 are arranged in an inverted V-shape when the laptop is suspended between the first and second suspension members 501, 502. When the laptop is so suspended, the first, second and third suspension members 501, 502 and 504 are arranged in an Inverted Y-shape. The sheath 506 in this embodiment comprises a clear vinyl plastic tube of 3 mm internal diameter which is 5 mm longer than the distance from the outer portions of the hinges to spread the bearing member so that is does not frictionably interact with the hinges which carry electronics to the screen.

Figure 5B:
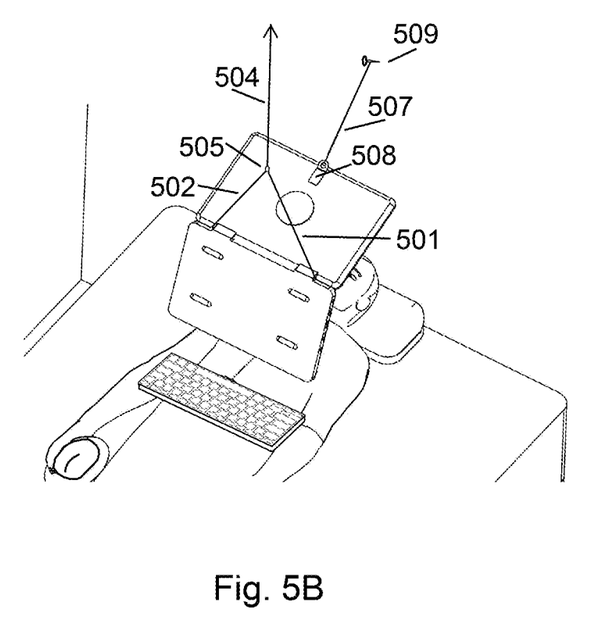
FIG. 5B is a top perspective view of an embodiment of a laptop suspension system with a sheath.

FIG. 5B is a top perspective view of an embodiment of a laptop suspension system with a sheath. Elongate stabilizer 507 is attached to a wall by fastener 509 (which may be a tack) and to the top of the lid opposite the screen of the hinged laptop by releasable connecting arrangement 508. The releasable connecting arrangement may comprise a releasable connecter. The elongate stabilizer 507 may serve multiple functions including but not limited to: prevention of spinning, elevation of the screen to a suitable viewing angle and dampening of movement if the electronic article is inadvertently bumped.

Figure 5C:
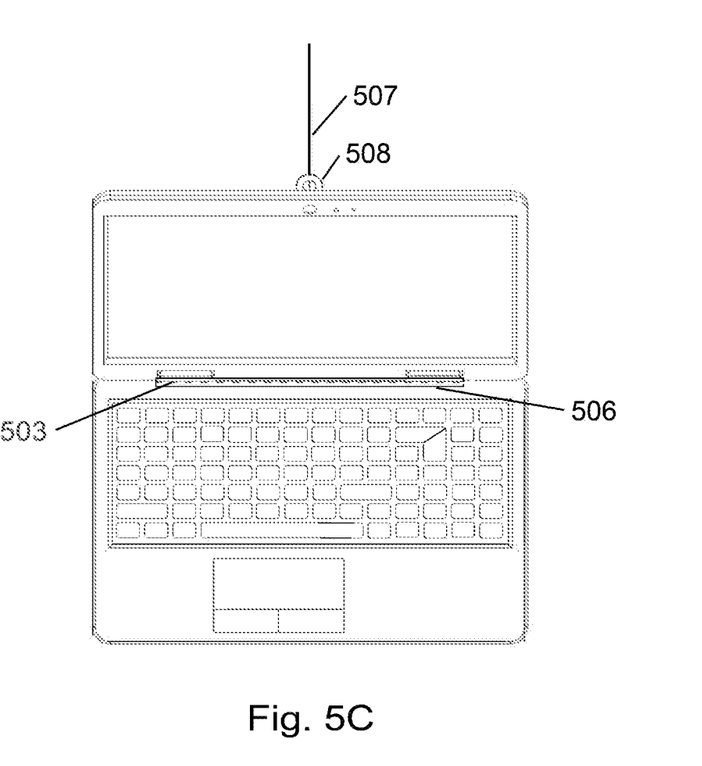
FIG. 5C is a bottom view of an embodiment of a deployed laptop suspension system with a sheath.

FIG. 5C is a bottom view of an embodiment of a deployed laptop suspension arrangement comprising a first, second and third suspension members 501, 502 and 504, sheath 506 which contains and through which passes the elongate bearing member 503 and junction 505 where the third suspension member 504 meets with the first and second suspension members 501 and 502. The sheath 506 in this embodiment comprises a clear vinyl plastic tube of 3 mm internal diameter which is 5 mm longer than the distance from the outer portions of the hinges to spread the bearing member 503 so that is does not frictionably interact with the hinges which carry electronics to the screen.

Figure 5D:
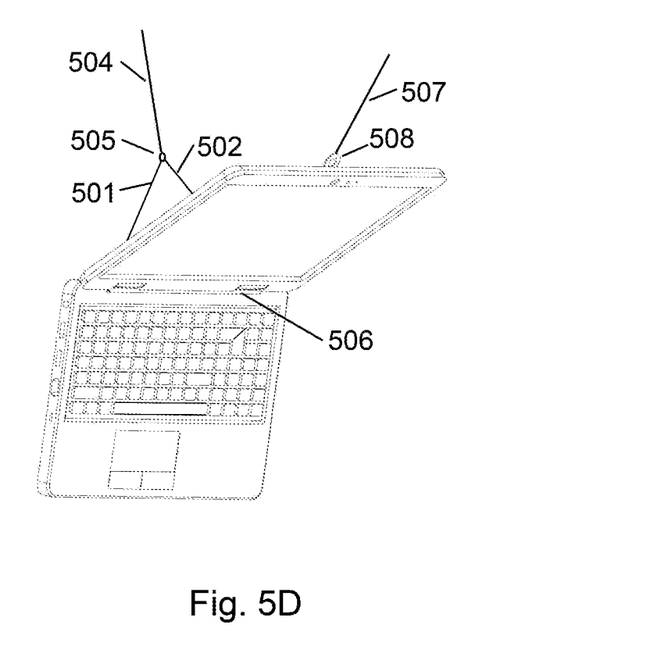
FIG. 5D is a closer bottom perspective view of an embodiment of a deployed laptop suspension system with a sheath.

FIG. 5D is a closer bottom perspective view of an embodiment of a deployed laptop suspension system with a sheath.

FIGS. 6A, 6B, 6C, and 6D depict an embodiment in different views.

Figure 6A:
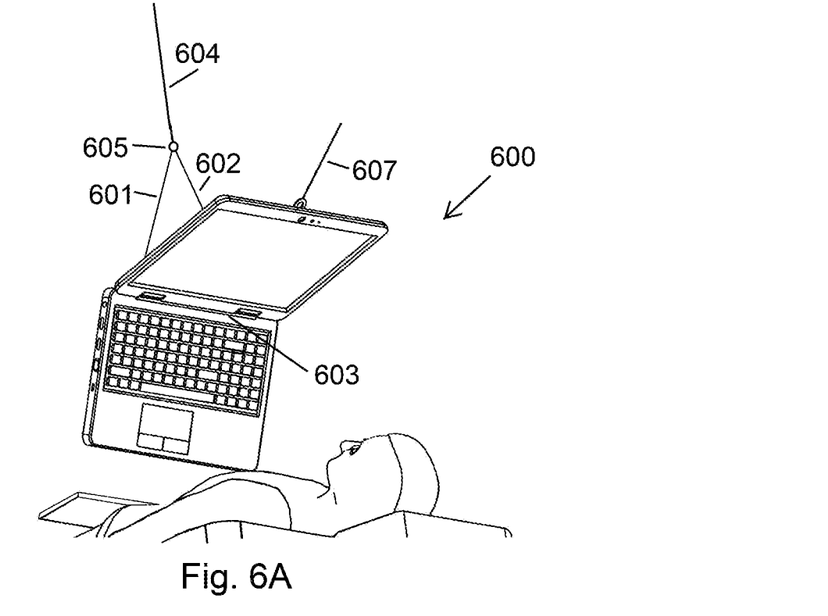
FIG. 6A is a bottom perspective view of an embodiment of a laptop suspension system without a sheath.

FIG. 6A is a bottom perspective view of an embodiment of a laptop suspension system 600 without a sheath. System 600 comprises first, second and third suspension members 601, 602 and 604, elongate bearing member 603 and junction 605 where the third suspension member 604 (attachment via eye-screw to wood ceiling unseen) meets with the first and second suspension members 601 and 602. The first and second suspension members 601, 602 are arranged in an inverted V-shape when the laptop is suspended between the first and second suspension members 601, 602. When the laptop is so suspended, the first, second and third suspension members 601, 602 and 604 are arranged in a Inverted Y-shape.

Figure 6B:
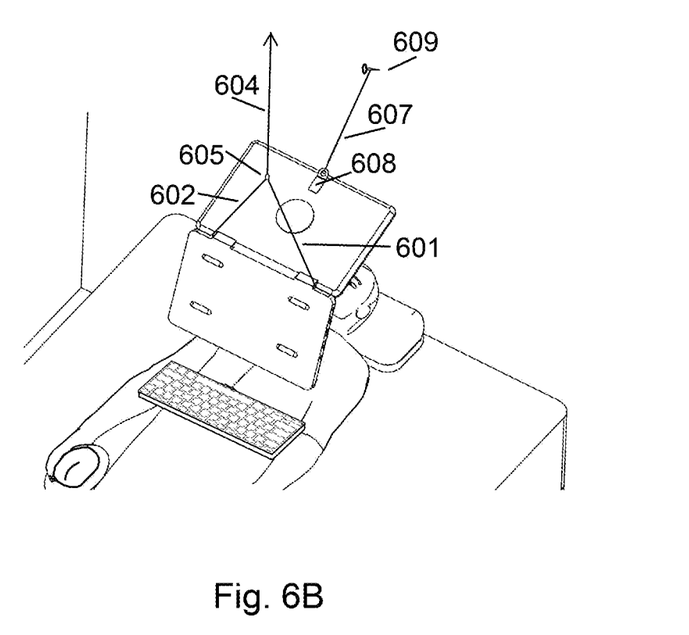
FIG. 6B is a top perspective view of an embodiment of a laptop suspension system without a sheath.

FIG. 6B is a top perspective view of an embodiment of a laptop suspension system lacking a sheath. Elongate stabilizer 607 is attached to the wall by fastener 609 (which may be a tack) and to the top of the lid opposite the screen of the hinged laptop by releasable connecting arrangement 608.

Figure 6C:
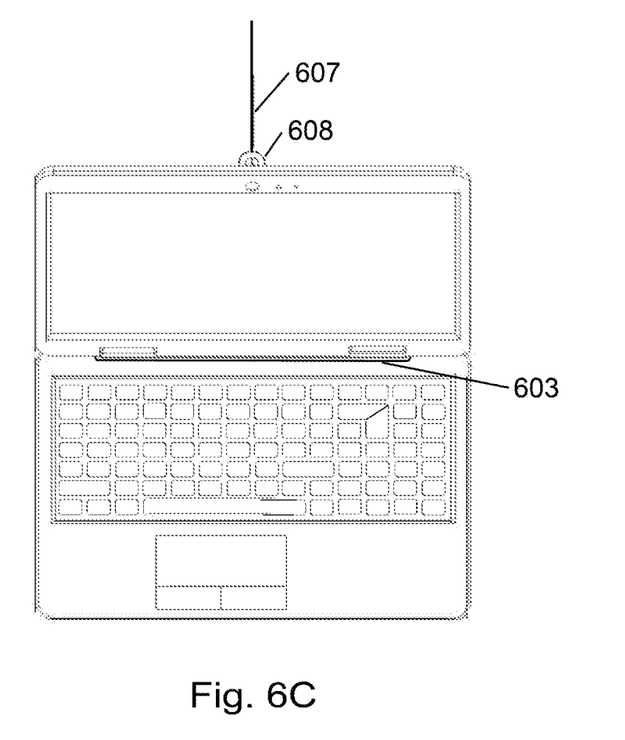
FIG. 6C is a bottom view of an embodiment of a deployed laptop suspension system without a sheath.

FIG. 6C is a bottom view of an embodiment of a deployed laptop suspension system without a sheath. embodiment of a laptop suspension arrangement comprising a first, second and third suspension members 601, 602 and 604, elongate bearing member 603 and junction 605 where the third suspension member 604 meets with the first and second suspension members 601 and 602. The laptop suspension arrangement may be divided into 2 or more discontinuous parts that may be fixedly or releasably attached by a variety of means including but not limited to screw threads and mates, snaps, hooks, and the like.

Figure 6D:
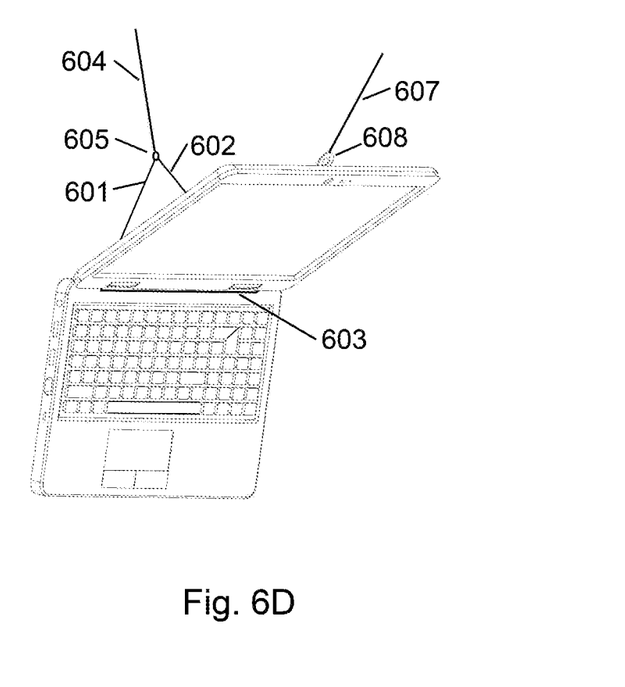
FIG. 6D is a closer bottom perspective view of an embodiment of a deployed laptop suspension system without a sheath.

FIG. 6D is a closer bottom perspective view of an embodiment of a deployed laptop suspension system without a sheath.

The invention claimed is:

1. A system for suspending a hinged electronic article, comprising:
    a hinged electronic article comprising two parts connected to each other at two hinges, wherein a first part of the two parts comprises a screen and a second part of the two parts comprises a keyboard, wherein a first crevice is formed between a first hinge of the two hinges and a first outer edge of the hinged electronic article, and wherein a second crevice is formed between a second hinge of the two hinges and a second outer edge of the hinged electronic article;
    a suspension arrangement for suspending the hinged electronic article along the two hinges, the suspension arrangement comprising:
        a first elongate suspension member;
        a second elongate suspension member extending from the first elongate suspension member;
        an elongate bearing member for carrying the electronic article adjacent to the two hinges, the elongate bearing member extending directly between the first and second suspension members, wherein the elongate bearing member is configured to be received along both of the two hinges in a fold between the screen and the keyboard, wherein the first elongate suspension member extends from the elongate bearing member and passes through the first crevice, and wherein the second elongate suspension member extends from the elongate bearing member and passes through the second crevice;
        a releasable connector releasably coupled with the screen of the hinged electronic article; and
        an elongate stabilizer extending from the releasable connector and configured for stabilizing the screen of the hinged electronic article, the elongate stabilizer being configured to be attached to a support above the hinged electronic article such that the screen faces at least substantially downward.

2. The system of claim 1, wherein the elongate bearing member is at least partially contained by a sheath.

3. The system of claim 1, wherein the first elongate suspension member, the second elongate suspension member and the bearing member are integral with each other.

4. The system of claim 1, further comprising an elongate third suspension member from which the first and second suspension members extend.

5. A suspension system according to claim 1, wherein the first suspension member extends from the second suspension member in a diverging configuration of the first and second suspension members, whereby the first and second suspension members define an inverted V-shape.

6. A suspension system according to claim 1, further comprising an elongate third suspension member from which the first and second suspension members extend, whereby the first, second and third suspension members define an Inverted Y-shape.

7. A method of suspending an electronic article having a pair of hinges, a pair of crevices corresponding to the pair of hinges and extending from the pair of hinges to respective outer edges of the electronic article, a keyboard, and a screen, the method comprising:
   providing a first elongate suspension member;
   providing a second elongate suspension member;
   providing a third elongate suspension member in an arrangement in which the third elongate suspension member extends from the first and/or second elongate suspension members;
   attaching the third elongate suspension member to an overhead support for supporting the first and second elongate suspension members;
   providing an elongate bearing member extending directly between the first and second elongate suspension members;
   arranging the electronic article in a folded position thereby forming a fold;
   arranging the elongate bearing member in said fold along the pair of hinges such that the elongate bearing member extends adjacent to each hinge of the pair of hinges;
   suspending the article between the first and second elongate suspension members on the bearing member in an orientation of the article in which the screen faces substantially downward and with the elongate bearing member extending between the pair of hinges, with the first and second elongate suspension members extending from opposing ends of the elongate bearing member outside of outer edges of the pair of hinges, and with the first and second elongate suspension members extending through the pair of crevices;
   providing an elongate stabilizer;
   releasably coupling a connector with the screen; and
   arranging the elongate stabilizer between a second overhead support and the connector to stabilize a position of the screen.

8. A method of suspending an electronic article according to claim 7, wherein each of at least two of the first elongate suspension member, the second elongate suspension member and the elongate bearing member is integral with one another.

* * * * *